(12) United States Patent
Ueno (10) Patent No.: US 11,404,924 B2
(45) Date of Patent: Aug. 2, 2022

(54) ROTOR

(71) Applicant: MEIDENSHA CORPORATION, Tokyo (JP)

(72) Inventor: Shun Ueno, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 17/428,710

(22) PCT Filed: Oct. 8, 2019

(86) PCT No.: PCT/JP2019/039562
§ 371 (c)(1),
(2) Date: Aug. 5, 2021

(87) PCT Pub. No.: WO2020/161960
PCT Pub. Date: Aug. 13, 2020

(65) Prior Publication Data
US 2022/0045564 A1    Feb. 10, 2022

(30) Foreign Application Priority Data
Feb. 7, 2019  (JP) .............................. JP2019-020270

(51) Int. Cl.
*H02K 1/27*    (2022.01)
*H02K 1/276*    (2022.01)
*H02K 29/03*    (2006.01)

(52) U.S. Cl.
CPC .............. *H02K 1/276* (2013.01); *H02K 29/03* (2013.01); *H02K 2213/03* (2013.01)

(58) Field of Classification Search
CPC ..... H02K 1/276; H02K 29/03; H02K 2213/03
See application file for complete search history.

(56) References Cited

U.S. PATENT DOCUMENTS

| 2008/0007131 A1 | 1/2008 | Cai et al. |
| 2016/0094097 A1* | 3/2016 | Fubuki ................. H02K 1/2766 310/156.53 |
| 2017/0179779 A1 | 6/2017 | Kaiser et al. |
| 2020/0044501 A1* | 2/2020 | Matsubara ............. H02K 29/03 |

FOREIGN PATENT DOCUMENTS

| CN | 104242509 A | 12/2014 |
| CN | 107565723 A | 1/2018 |
| JP | 5259927 B2 | 8/2013 |
| JP | 2016-73056 A | 5/2016 |

\* cited by examiner

*Primary Examiner* — Thomas Truong
(74) *Attorney, Agent, or Firm* — Foley & Lardner LLP (57) ABSTRACT

There is provided a rotor that is capable of improving torque and rotational speed while securing mechanical strength. The rotor is equipped with a plurality of outer radial-side magnet slots 12, 13, a plurality of inner radial-side magnet slots 14, 15, a plurality of outer radial-side magnets 21, 22 that are respectively fit into the outer radial-side magnet slots 12, 13, and a plurality of inner radial-side magnets 23, 24 that are respectively fit into the inner radial-side magnet slots 14, 15. Lb2>Lb1 is satisfied, when one 12c, 13c of the recesses 12a-12d, 13a-13d of the outer radial-side magnet slot 12, 13 that is closest to the d-axis has a radial length of Lb1, and when one 14d, 15d of the recesses of the inner radial-side magnet slot 14, 15 that is closest to the d-axis has a radial length of Lb2.

6 Claims, 6 Drawing Sheets

ROTOR

The present invention relates to a rotor provided in a rotary electric machine.

BACKGROUND ART

Of rotors provided in rotary electric machines, in rotors where magnets are embedded, in order to improve torque without increasing the amount of magnet, as disclosed, for example, in the following Patent Publication 1, there is known a method in which magnets are in a multi-layer arrangement to improve the salient pole ratio.

PRIOR ART PUBLICATIONS

Patent Publications

Patent Publication 1: JP Patent 5259927.

SUMMARY OF THE INVENTION

Task to be Solved by the Invention

The above Patent Publication 1 discloses that magnets are in a multi-layer arrangement to improve output while reducing torque ripple. However, strength of the rotor is not considered therein. Thus, there is a possibility that the rotor is damaged in a high-speed rotation.

In view of the above-mentioned technical task, it is one object of the present invention to provide a rotor that is capable of improving torque and rotation speed, while securing mechanical strength.

Means for Solving the Task

A rotor according to a first invention for solving the above task is characterized by comprising:

a plurality of outer radial-side magnet slots that are arranged in a rotor core to be spaced away in linear symmetry with respect to each d-axis in a radial sectional view, each of the plurality of outer radial-side magnet slots being formed at four corners thereof with recesses extending outwardly;

a plurality of inner radial-side magnet slots that are arranged in the rotor core to be spaced away in linear symmetry with respect to each d-axis in the radial sectional view, each of the plurality of inner radial-side magnet slots having on a side of each d-axis an end that is positioned on an inner radial side than an end of the outer radial-side magnet slot on a side of each d-axis and being formed at four corners thereof with recesses extending outwardly;

a plurality of outer radial-side magnets each having a rectangular shape in the radial sectional view and being fit into each of the outer radial-side magnet slots; and a plurality of inner radial-side magnets each having a rectangular shape in the radial sectional view and being fit into each of the inner radial-side magnet slots, wherein $Lb2 > Lb1$ is satisfied, when one of the recesses of the outer radial-side magnet slot that is closest to the d-axis has a radial length of $Lb1$, and when one of the recesses of the inner radial-side magnet slot that is closest to the d-axis has a radial length of $Lb2$.

In the rotor according to the first invention, a rotor according to a second invention for solving the above task is characterized in that $0.42 \leq W1/W2 \leq 0.63$ is satisfied, when the outer radial-side magnet has a longitudinal length of $W1$ in the radial sectional view, and when the inner radial-side magnet has a longitudinal length of $W2$ in the radial sectional view.

In the rotor according to the second invention, a rotor according to a third invention for solving the above task is characterized in that $0.45 \leq W1/W2 \leq 0.63$ is further satisfied.

In the rotor according to any one of the first to the third inventions, a rotor according to a fourth invention for solving the above task is characterized in that $0.5 \leq \alpha \leq 1$ where $\alpha = (L1-L3)/(L4-L3)$, and $L1 < L2$ are satisfied, wherein $L1$ is a shortest distance between the outer radial-side magnet and an axis of the rotor, $L2$ is a distance between a corner portion of the outer radial-side magnet that is closest to q-axis and the axis of the rotor, $L3$ is a shortest distance between the inner radial-side magnet and the axis of the rotor, and $L4$ is a maximum distance between the inner radial-side magnet and the axis of the rotor.

In the rotor according to the fourth invention, a rotor according to a fifth invention for solving the above task is characterized in that $0.5 \leq \alpha \leq 0.85$ is further satisfied.

In the rotor according to any one of the first to fifth inventions, a rotor according to a sixth invention for solving the above task is characterized in that the inner radial-side magnet comprises a plurality of inner radial-side magnet fragments.

Advantageous Effect of the Invention

It becomes possible by a rotor according to the present invention to improve torque and rotational speed while securing mechanical strength.

MODE FOR IMPLEMENTING THE INVENTION

In the following, a rotor according to the present invention is explained by embodiments with reference to the drawings.

First Embodiment

Figure 1:
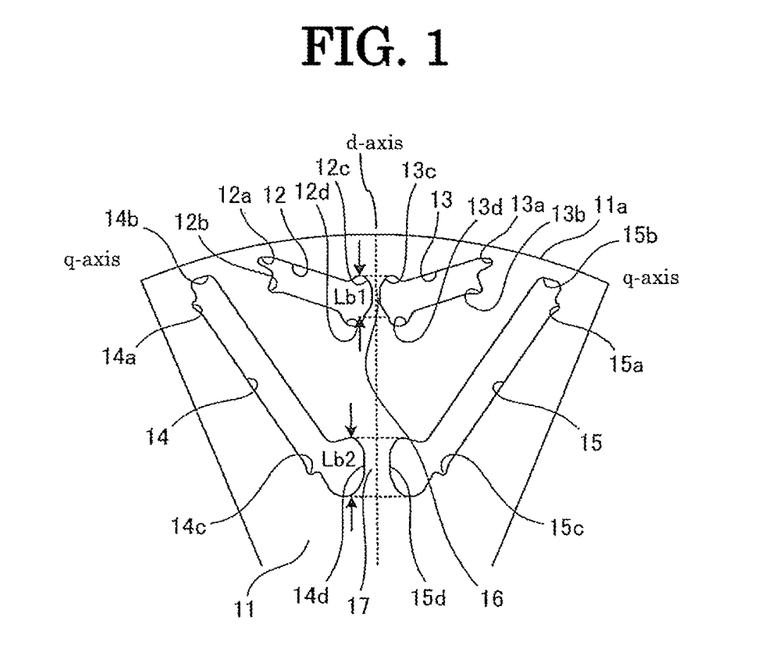
FIG. 1 is an enlarged fragmentary view of a rotor core in the first embodiment of the present invention.
Figure 2:
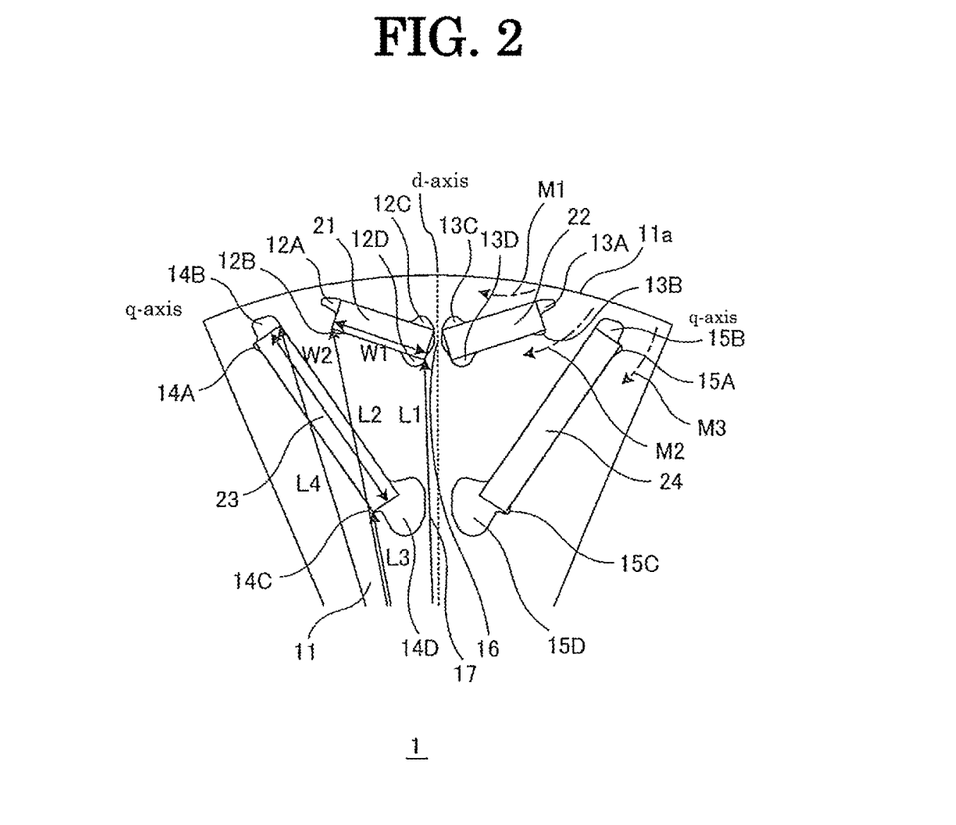
FIG. 2 is an enlarged fragmentary view a rotor according to the first embodiment of the present invention.

Firstly, using enlarged fragmentary views of FIGS. 1 and 2, configuration of a rotor (rotor 1) according to the present embodiment is explained. In FIGS. 1 and 2, d-axis represented by a broken line and q-axis are general notations respectively indicate a main magnetic flux direction and a direction that meets d-axis at right angles electrically and magnetically. FIGS. 1 and 2 show a range from a q-axis to another q-axis that is adjacent to the q-axis in circumferential direction.

The rotor 1 has a configuration in which magnets are in a multi-layer arrangement in radial direction. It is equipped with a rotor core 11 having a plurality of magnet slots 12-15, and a plurality of magnets 21-24 that are respectively arranged in these magnet slots 12-15 and are in a rectangular shape in the radial sectional view. Of the rotor 1, a part not shown in the drawings has a configuration similar to that shown in the drawings, but it is omitted in the following in order to avoid repetition of the explanation.

As shown in FIG. 2, the two outer radial-side magnet slots 12, 13 (in the radial sectional view) are arranged in line symmetry with respect to d-axis in the vicinity of an outer periphery 11a of the rotor core 11. Furthermore, each of the outer radial-side magnet slots 12, 13 is formed to extend such that one end (the after-mentioned recesses 12c, 12d, 13c, 13d) on the d-axis side is positioned on an inner radial side than the other end (the after-mentioned recesses 12a, 12b, 13a, 13b) on the q-axis side.

Similarly, as shown in FIG. 2, the two inner radial-side magnet slots 14, 15 (in the radial sectional view) are arranged in line symmetry with respect to d-axis. Furthermore, each of the inner radial-side magnet slots 14, 15 is formed to extend such that one end (the after-mentioned recesses 14c, 14d, 15c, 15d) on the d-axis side is positioned on an inner radial side than the other end (the after-mentioned recesses 14a, 14b, 15a, 15b) on the q-axis side.

Furthermore, one end (the after-mentioned recesses 14c, 14d, 15c, 15d) of the inner radial-side magnet slot 14, 15 on the d-axis side is positioned on an inner radial side than the above-mentioned one end in the outer radial-side magnet slot 12, 13 on the d-axis side.

Moreover, the other end (the after-mentioned recesses 14a, 14b, 15a, 15b) of the inner radial-side magnet slot 14, 15 is positioned in the circumferential direction at a position between the other end of the above-mentioned outer radial-side magnet slot 12, 13 on the q-axis side and the q-axis that is closest to the other end.

Each of the magnet slots 12-15 is formed at its four corners with recesses extending outwardly. That is, as shown in FIG. 1, the outer radial-side magnet slot 12 is formed at its four corners with recesses 12a-12d, the outer radial-side magnet slot 13 at its four corners with recesses 13a-13d, the outer radial-side magnet slot 14 at its four corners with recesses 14a-14d, and the outer radial-side magnet slot 15 at its four corners with recesses 15a-15d.

As shown in FIG. 2, the outer radial-side magnets 21, 22 are respectively used as magnets to be arranged at the outer radial-side magnet slots 12, 13. The outer radial-side magnets 21, 22 are arranged by fitting into the outer radial-side magnet slots 12, 13 (parts except their respective recesses). Similarly, the inner radial-side magnets 23, 24 are respectively used as magnets to be arranged at the inner radial-side magnet slots 14, 15. The inner radial-side magnets 23, 24 are arranged by fitting into the inner radial-side magnet slots 14, 15 (parts except their respective recesses).

In a condition in which the magnets 21-24 are respectively arranged at the magnet slots 12-15, there is provided a shape in which a void space as a nonmagnetic region (flux barrier) is formed between each recess and the magnet 12-15.

That is, as shown in FIG. 2, the outer radial-side magnet slot 12 is formed with a void space 12A between the recess 12a and the outer radial-side magnet 21, a void space 12B between the recess 12b and the outer radial-side magnet 21, a void space 12C between the recess 12c and the outer radial-side magnet 21, and a void space 12D between the recess 12d and the outer radial-side magnet 21. Of these, however, as to the void space 12C, the space is divided into two as a corner portion of the outer radial-side magnet 21 is in abutment with the recess 12c.

Similarly, in a condition in which the magnets 22-24 are respectively arranged, void spaces 13A-13D, 14A-14D, 15A-15D are respectively formed at the recesses 13a-13d, 14a-14d, 15a-15 of the other magnet slots 13, 14, 15, too. In the void spaces 13C, 14C, 15C, each space is divided into two by the magnet 22, 23, 24.

Furthermore, the rotor core 11 is formed with an outer radial-side bridge portion 16 between the recess 12c of the outer radial-side magnet slot 12 and the recess 13c of the outer radial-side magnet slot 13, and an inner radial-side bridge portion 17 between the recess 14d of the inner radial-side magnet slot 14 and the recess 15d of the inner radial-side magnet slot 15.

In other words, in the rotor core 11, the outer radial-side magnet slot 12 and the outer radial-side magnet slot 13 are formed to be away from each other, and the inner radial-side magnet slot 14 and the inner radial-side magnet slot 15 are also formed to be away from each other.

As shown in FIG. 1, in the rotor core 11, Lb2>Lb1 is satisfied, where Lb1 is defined as the radial length of the outer radial-side bridge portion 16, that is, the radial length of the recesses 12c, 13c (the recesses closest to d-axis in the recesses of the outer radial-side magnet slots 12, 13), and Lb2 is defined as the radial length of the inner radial-side bridge portion 17, that is, the radial length of the recesses 14d, 15d (the recesses closest to d-axis in the recesses of the outer radial-side magnet slots 14, 15).

Then, as shown in FIG. 2, $0.42 \leq W1/W2 \leq 0.63$, preferably $0.45 \leq W1/W2 \leq 0.63$, is satisfied, where W1 is defined as the length in the longitudinal direction (in the radial sectional view) of the outer radial-side magnet 21, 22 (the extension direction of the outer radial-side magnet slot 12, 13 in FIG. 1), and W2 is defined as the length in the longitudinal direction (in the radial sectional view) of the inner radial-side magnet 23, 24 (the extension direction of the inner radial-side magnet slot 14, 15 in FIG. 1).

Furthermore, $0.5 \leq \alpha \leq 1$, preferably $0.5 \leq \alpha \leq 0.85$, where $\alpha=(L1-L3)/(L4-L3)$, and $L1<L2$ are satisfied, wherein L1 is defined as the shortest distance between the outer radial-side magnet 21, 22 and an axis (not shown in the drawings) of the rotor 1, L2 is defined as the distance between a corner portion of the outer radial-side magnet 21, 22 that is closest to q-axis and the axis of the rotor 1, L3 is defined as the shortest distance between the inner radial-side magnet 23, 24 and the axis of the rotor 1, and L4 is defined as the maximum distance between the inner radial-side magnet 23, 24 and the axis of the rotor 1.

The above is the explanation of the configuration of the rotor 1.

Herein, if the magnet width ratio of the outer radial-side magnet 21, 22 to the inner radial-side magnet 23, 24 is changed to satisfy $W1/W2<0.42$, the size of the outer radial-side magnet 21, 22 becomes too small, resulting in lowering of magnet torque. If the magnet width ratio is changed to satisfy $0.63<W1/W2$, the size of the outer radial-side magnet 21, 22 becomes too large. With this, a magnetic path (particularly the after-mentioned magnetic path M2) of the rotor core 11 becomes narrow, resulting in lowering of reluctance torque.

Figure 4:
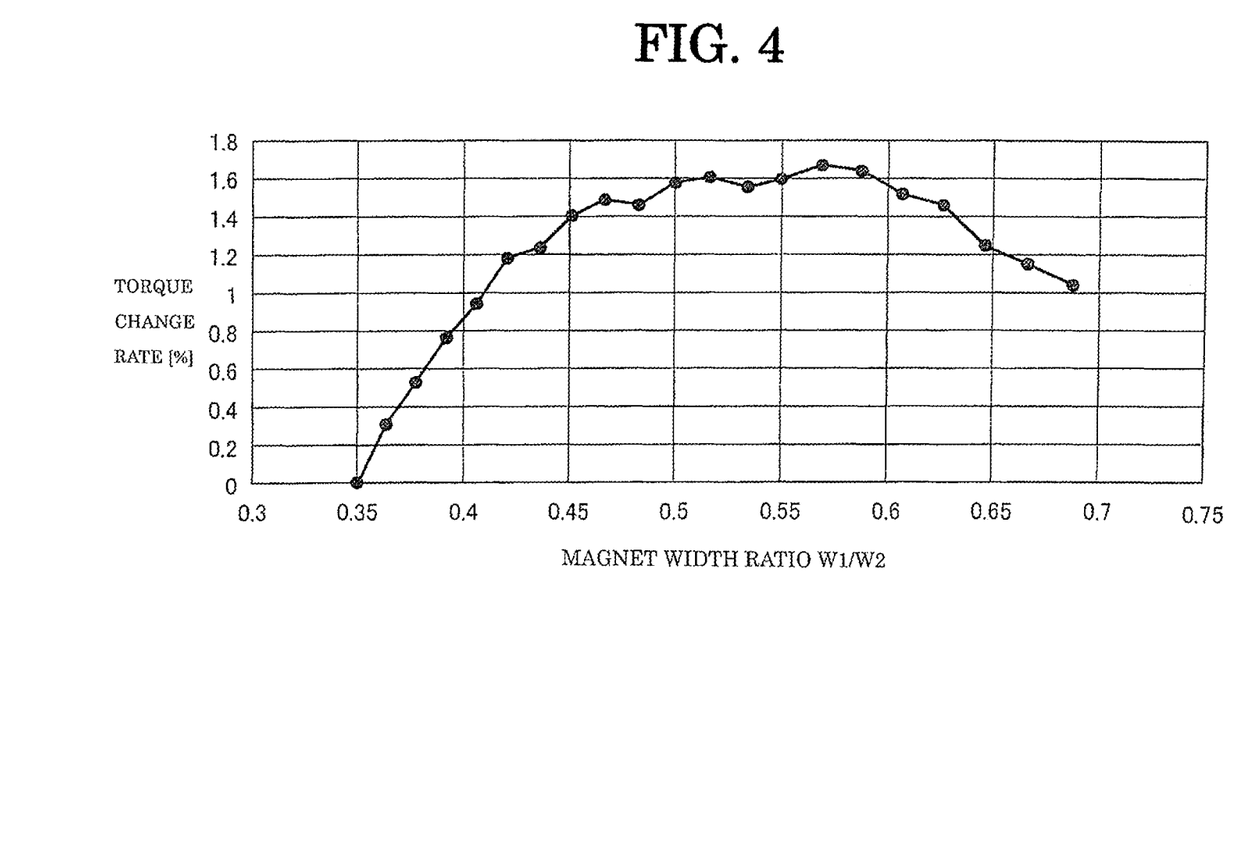
FIG. 4 is a graph showing an analysis result of a relationship between magnet width ratio and torque change rate in the first embodiment of the present invention.

FIG. 4 is a graph showing an analysis result of a relationship between the magnet width ratio of W1/W2 and the torque change rate.

As to the torque change rate in this graph, W1/W2=0.35 is taken as the standard (0%). This graph shows that torque rate lowers greatly in regions of W1/W2<0.42 and 0.63<W1/W2.

Therefore, it is possible to have a high torque characteristic by satisfying $0.42 \leq W1/W2 \leq 0.63$, more preferably $0.45 \leq W1/W2 \leq 0.63$, as in the present embodiment.

Furthermore, generally, during rotation of a rotor having a configuration in which magnets are in a multi-layer arrangement in radial direction, a larger stress is generated in the inner radial-side bridge portion 17 than in the outer radial-side bridge portion 16. This is caused by a production step to shrink fit a rotation shaft on the inner radial side of the rotor 1, and because the inner radial side of the rotor 1 receives a stress during shrink fitting besides centrifugal force.

Thus, the inner radial-side bridge 17 is more gently curved than the outer radial-side bridge portion 16 by satisfying Lb2>Lb1 in the rotor 1. With this, it is possible to increase strength and prevent damage during a high-speed rotation.

Figure 3:
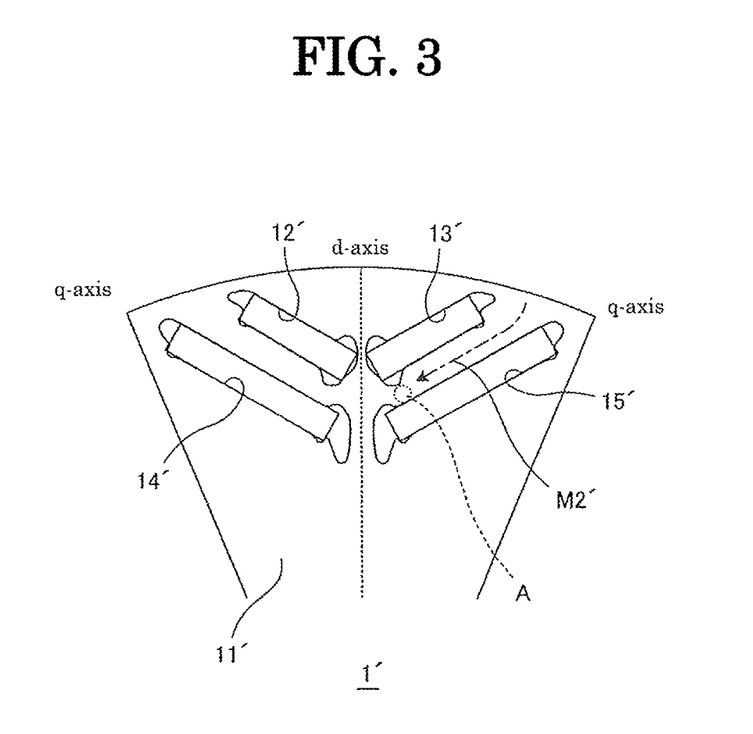
FIG. 3 is an enlarged fragmentary view of a rotor in which an inner radial-side bridge portion has a radial length that is longer than that of an outer radial-side bridge portion, and in which an end of the inner radial-side magnet slot on a side of d-axis is close to the outer radial-side magnet slot.

However, a simple relationship of Lb2>Lb1 is satisfied, for example, even by a shape of the rotor 11' of FIG. 3. In the rotor 1' shown in FIG. 3, of the magnet slots 12' to 15' to be formed in the rotor core 11', the outer radial-side magnet slot 12', 13' have a shape similar to that of the outer radial-side magnet slot 12, 13 in FIGS. 1 and 2, but the inner radial-side magnet slot 14', 15' has a shape in which its one end on the d-axis side is closer to the outer radial-side magnet slot 12', 13', as compared with the inner radial-side metal slot 14, 15 in FIGS. 1 and 2.

In a rotor having a configuration in which magnets are in a multi-layer arrangement in radial direction, as shown by an arrow of dashed line in FIG. 2, there are a magnetic path M1 passing between the outer radial-side magnet slot 13 and the outer periphery 11a, a magnetic path M2 passing between the outer radial-side magnet slot 13 and the inner radial-side magnet slot 15, and a magnetic path M3 passing between the inner radial-side magnet slot 15 and q-axis closest thereto.

In the case of the rotor 1' shown in FIG. 3, the distance between the outer radial-side magnet slot 12', 13' and the inner radial-side magnet slot 14', 15' becomes narrow. That is, as shown by an arrow of dashed line in FIG. 3, the width of the magnetic path M2' (corresponding to the magnetic path M2 in FIG. 2) passing between the outer radial-side magnet slot 12', 13' and the inner radial-side magnet slot 14', 15' becomes narrow particularly at a position around a broken line circle A (around one end on the d-axis side). With this, there is a risk to cause magnetic saturation and lowering of reluctance torque.

Thus, the sizes of the magnets 21-24 are adjusted to satisfy $0.42 \leq W1/W2 \leq 0.63$, more preferably $0.45 \leq W1/W2 \leq 0.63$, and the magnet slots 12-15 are arranged to satisfy $0.5 \leq \alpha \leq 1$ where $\alpha = (L1-L3)/(L4-L3)$, and L1<L2. With this, while having the same cross-sectional areas of the magnets 21-24 in the radial sectional view, it is possible to secure the distance between the magnet slots 12-15, that is, the magnetic path M1, the magnetic path M2 and the magnetic path M3. With this, in the rotor 1, it is possible to suppress magnetic saturation and achieve improvement of torque.

Figure 5:
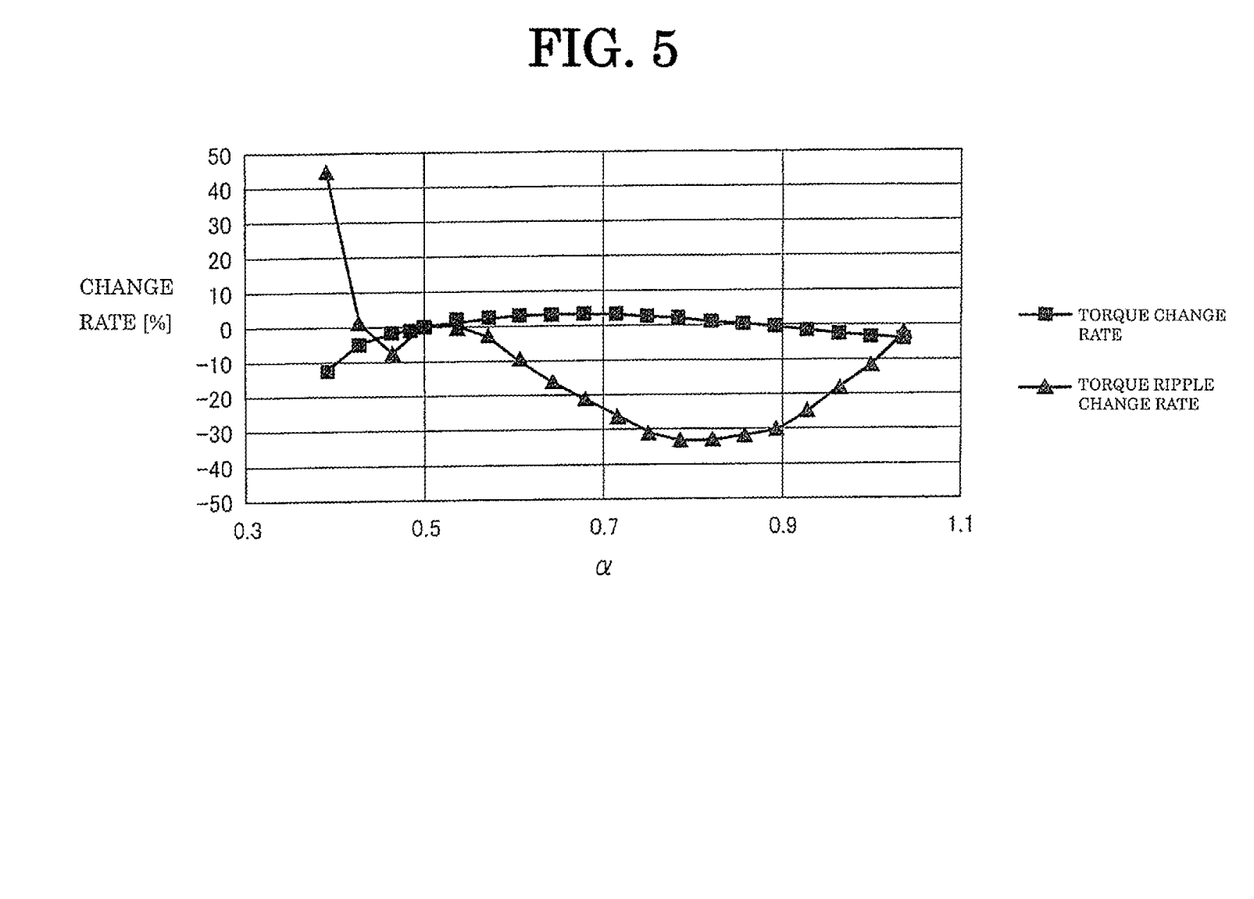
FIG. 5 is a graph showing an analysis result of a relationship between a shortest distance between the outer radial-side magnet and an axis of the rotor, a distance between a corner portion of the outer radial-side magnet that is closest to q-axis and the axis of the rotor, a shortest distance between the inner radial-side magnet and the axis of the rotor, and a maximum distance between the inner radial-side magnet and the axis of the rotor, and torque change rate.

FIG. 5 is a graph showing an analysis result of a relationship between $\alpha$ and torque change rate. This graph is provided under a precondition of W1/W2=0.57, L3=45 mm and L4=59 mm. As to the torque change rate, $\alpha=0.5$ is taken as the standard (0%). This graph shows that the torque reduction rate is larger in a region of $\alpha<0.5$ than in a region of $\alpha \geq 0.5$.

Furthermore, the torque ripple lowers once and then increases greatly in a region of $\alpha<0.5$. This indicates a high sensitivity (susceptibility) to the production variation.

Therefore, $0.5 \leq \alpha \leq 1$ is suitable. Preferably, a range of $0.5 \leq \alpha \leq 0.85$ where torque becomes maximum and torque ripple becomes minimum is suitable.

In this way, in the present embodiment, the inner radial-side bridge portion where a particularly large stress is generated is gently curved. With this, mechanical strength is improved, thereby making a high speed rotation possible. By increasing the distance between the outer radial-side magnet slot and the inner radial-side magnet slot and by gently curving the bridge portion, even if a nonmagnetic region increases, it is possible to suppress magnetic saturation, that is, lowering of torque, thereby making high torque and high speed rotation possible.

Second Embodiment

Figure 6:
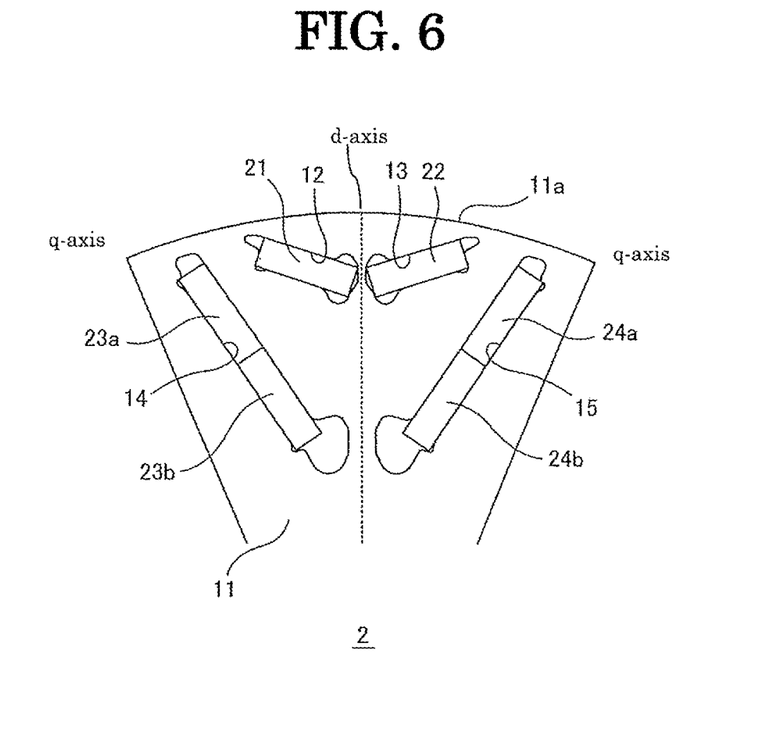
FIG. 6 is an enlarged fragmentary view a rotor according to the second embodiment of the present invention.

Using an enlarged fragmentary view of FIG. 6, configuration of a rotor (rotor 2) according to the present embodiment is explained. In the following, the configuration that is different from the rotor 1 of the first embodiment is mainly explained, and explanation of the same configuration as that of the rotor 1 of the first embodiment is omitted as much as possible.

Even in FIG. 6, similar to FIGS. 1 and 2, d-axis represented by a broken line and q-axis respectively indicate a main magnetic flux direction and a direction that meets d-axis at right angles electrically and magnetically. FIG. 6 shows a range from a q-axis to another q-axis that is adjacent to the q-axis in circumferential direction.

In the rotor 2, as shown in FIG. 6, the inner radial-side magnet (the inner radial-side magnet 23 in the rotor 1) fitted in the inner radial-side magnet slot 14 is formed of inner radial-side magnet fragments 23a, 23b aligned in the longitudinal direction (in the radial sectional view), and the inner radial-side magnet (the inner radial-side magnet 24 in the rotor 1) fitted in the inner radial-side magnet slot 15 is formed of inner radial-side magnet fragments 24a, 24b aligned in the longitudinal direction (in the radial sectional view).

The inner radial-side magnet fragments 23a, 23b are those prepared by bisecting the inner radial-side magnet (the inner radial-side magnet 23 in the rotor 1) fitted in the inner radial-side magnet slot 14 in the longitudinal direction (in the radial sectional view), and the inner radial-side magnet fragments 24a, 24b are those prepared by bisecting the inner radial-side magnet (the inner radial-side magnet 24 in the rotor 1) in the longitudinal direction (in the radial sectional view).

By having the above-mentioned configuration, the rotor 2 is capable of reducing loss of magnet. This improves the motor efficiency and reduces the temperature increase. Therefore, it is possible to achieve a longer continuous operation time.

Although the present embodiment provides those prepared by bisecting each inner radial-side magnet, which is fitted in the inner radial-side magnet slot 14, 15, in the longitudinal direction (in the radial sectional view), the present invention is not limited to this. That is, it suffices that the inner radial-side magnet is formed of a plurality of inner radial-side magnet fragments, irrespective of angle of division, the number of divisions, and their division width ratios.

INDUSTRIAL APPLICABILITY

The present invention is suitable as a rotor provided in a rotary electric machine.

EXPLANATION OF SIGNS 1, 1', 2 . . . rotor
11, 11' . . . rotor core
11a . . . (rotor core's) outer periphery
12, 13, 12', 13' . . . outer radial-side magnet slot
14, 15, 14', 15' . . . inner radial-side magnet slot
12a-12d, 13a-13d, 14a-14d, 15a-15d . . . recess
12A-12D, 13A-13D, 14A-14D, 15A-15D . . . void space
16 . . . outer radial-side bridge portion
17 . . . inner radial-side bridge portion
21, 22 . . . outer radial-side magnet
23, 24 . . . inner radial-side magnet
23a, 23b, 24a, 24b . . . inner radial-side magnet fragment
M1, M2, M2', M3' . . . magnetic path

The invention claimed is:

1. A rotor comprising:
   a plurality of outer radial-side magnet slots that are arranged in a rotor core to be spaced away in linear symmetry with respect to each d-axis in a radial sectional view, each of the plurality of outer radial-side magnet slots being formed at four corners thereof with recesses extending outwardly;
   a plurality of inner radial-side magnet slots that are arranged in the rotor core to be spaced away in linear symmetry with respect to each d-axis in the radial sectional view, each of the plurality of inner radial-side magnet slots having on a side of each d-axis an end that is positioned on an inner radial side than an end of the outer radial-side magnet slot on a side of each d-axis and being formed at four corners thereof with recesses extending outwardly;
   a plurality of outer radial-side magnets each having a rectangular shape in the radial sectional view and being fit into each of the outer radial-side magnet slots;
   a plurality of inner radial-side magnets each having a rectangular shape in the radial sectional view and being fit into each of the inner radial-side magnet slots;
   an outer radial-side bridge portion that is curvedly formed between the recesses of both outer radial-side magnet slots; and
   an inner radial-side bridge portion that is curvedly formed between the recesses of both inner radial-side magnet slots,
   wherein Lb2>Lb1 is satisfied, when one of the recesses of the outer radial-side magnet slot that is closest to the d-axis has a radial length of Lb1, and when one of the recesses of the inner radial-side magnet slot that is closest to the d-axis has a radial length of Lb2,
   wherein the inner radial-side bridge portion is more gently curved than the outer radial-side bridge portion,
   wherein $0.42 \leq W1/W2 \leq 0.63$ is satisfied, when the outer radial-side magnet has a longitudinal length of W1 in the radial sectional view, and when the inner radial-side magnet has a longitudinal length of W2 in the radial sectional view.

2. The rotor as claimed in claim 1, wherein $0.45 \leq W1/W2 \leq 0.63$ is further satisfied.

3. The rotor as claimed in claim 1, wherein the inner radial-side magnet comprises a plurality of inner radial-side magnet fragments.

4. A rotor comprising:
   a plurality of outer radial-side magnet slots that are arranged in a rotor core to be spaced away in linear symmetry with respect to each d-axis in a radial sectional view, each of the plurality of outer radial-side magnet slots being formed at four corners thereof with recesses extending outwardly;
   a plurality of inner radial-side magnet slots that are arranged in the rotor core to be spaced away in linear symmetry with respect to each d-axis in the radial sectional view, each of the plurality of inner radial-side magnet slots having on a side of each d-axis an end that is positioned on an inner radial side than an end of the outer radial-side magnet slot on a side of each d-axis and being formed at four corners thereof with recesses extending outwardly;
   a plurality of outer radial-side magnets each having a rectangular shape in the radial sectional view and being fit into each of the outer radial-side magnet slots;
   a plurality of inner radial-side magnets each having a rectangular shape in the radial sectional view and being fit into each of the inner radial-side magnet slots;
   an outer radial-side bridge portion that is curvedly formed between the recesses of both outer radial-side magnet slots; and
   an inner radial-side bridge portion that is curvedly formed between the recesses of both inner radial-side magnet slots,
   wherein Lb2>Lb1 is satisfied, when one of the recesses of the outer radial-side magnet slot that is closest to the d-axis has a radial length of Lb1, and when one of the recesses of the inner radial-side magnet slot that is closest to the d-axis has a radial length of Lb2,
   wherein the inner radial-side bridge portion is more gently curved than the outer radial-side bridge portion,
   wherein $0.5 \leq \alpha \leq 1$ where $\alpha=(L1-L3)/(L4-L3)$, and L1<L2 are satisfied, wherein L1 is a shortest distance between the outer radial-side magnet and an axis of the rotor, L2 is a distance between a corner portion of the outer radial-side magnet that is closest to a q-axis and the axis of the rotor, L3 is a shortest distance between the inner radial-side magnet and the axis of the rotor, and L4 is a maximum distance between the inner radial-side magnet and the axis of the rotor.

5. The rotor as claimed in claim 4, wherein $0.5 \leq \alpha \leq 0.85$ is further satisfied.

6. The rotor as claimed in claim 4, wherein the inner radial-side magnet comprises a plurality of inner radial-side magnet fragments.

* * * * *